D. B. SMITH.
Steak-Cooking Pan.

No. 162,961.    Patented May 4, 1875.

WITNESSES:
Edw. W. Byrn
W. W. Hollingsworth

INVENTOR:
David B. Smith
BY
ATTORNEYS.

THE GRAPHIC CO. PHOTO-LITH. 39 & 41 PARK PLACE, N.Y.

UNITED STATES PATENT OFFICE

DAVID B. SMITH, OF BASTROP, LOUISIANA.

IMPROVEMENT IN STEAK-COOKING PANS.

Specification forming part of Letters Patent No. 162,961, dated May 4, 1875; application filed April 6, 1875.

*To all whom it may concern:*

Be it known that I, DAVID BURREL SMITH, of Bastrop, in the parish of Morehouse and State of Louisiana, have invented a new and Improved Steak Cooking Pan; and I do hereby declare that the following is a full, clear, and exact description of the same, reference being had to the accompanying drawing forming a part of this specification, in which—

Figure 1:
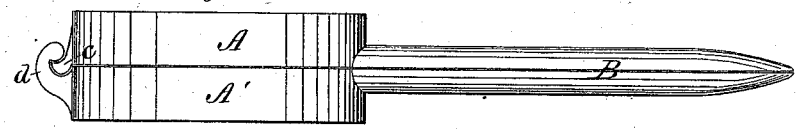
Figure 2:
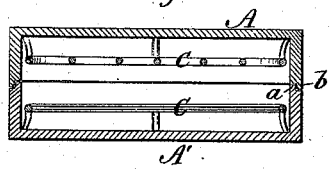
Figure 3:
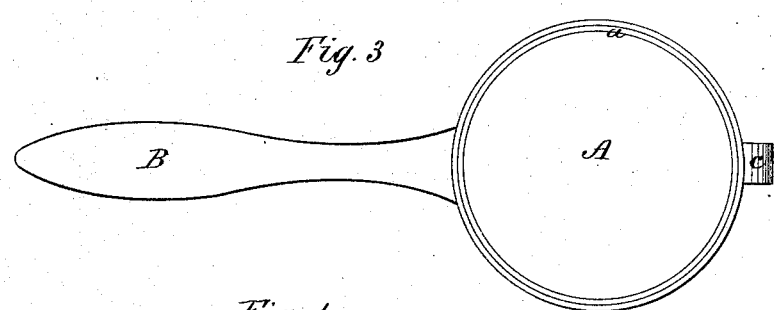
Figure 4:
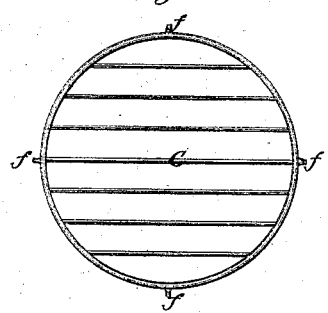

Figure 1 is a side elevation; Fig. 2, a cross-section; Fig. 3, a plan view; Fig. 4, a detail of the griddle.

The object of this invention is to provide an improved arrangement for broiling steak and other meats, by means of which all of the flavor and juice of the meat are preserved, the tendency to burn obviated, and the meat cooked free from ashes and without the taste of smoke imparted thereto. It consists in two symmetrically-shaped pans, having extended handles, one of the said pans being made with a recess or depression at its edge, and the other with a corresponding lip, which, when the pans are placed together, insure a tightly-closed chamber. The pans, which are detachably fastened together, are also provided with detachable circular griddles, having feet which hold the steak in a central position between the sides of the pan, in such a manner as to admit of the turning of the device to cook both sides of the steak.

In the drawing, A A′ represent the two symmetrically-shaped pans, having prolonged handles B. One of these pans has a recess, $a$, upon its edge, and the other a lip, $b$, to fit therein, which, when the two pans are placed together, makes a tight closed clamber. Said pans are held together at one end by the handles, which are placed together, and are both grasped at one time, and at the opposite side are detachably fastened by means of a hook, $c$, of one pan, which is inserted under a curved extension or lip, $d$, of the other. Inside the two pans are arranged the griddles C, which are circular in form to correspond with the pans, and are provided with legs $f$, which hold them away from the sides of the pan.

Said griddles may be made of wire or cast-iron, and between the two, in the center of the two pans, the steak is held, the symmetrical arrangement of both sides of the apparatus admitting of the reversing of the same to cook both sides of the meat.

I am aware of the fact that numerous broiling-pans of the same general form have been constructed, and in defining the limits of my invention fully disclaim the Patents Nos. 61,478, 120,768, 96,973, and 63,753, confining my invention to the particular construction of a closed chamber in combination with the detachable griddles.

Having thus described my invention, what I claim as new is—

The cooking-pan, consisting of the separate pans A A′, fitted together with a recess, $a$, and lip $b$, to form a closed chamber, and held by a hook, $c$, and curved lip $d$, and the griddles C, having legs $f$, all constructed, combined, and arranged as shown and described.

DAVID BURREL SMITH.

Witnesses:
 CHAS. A. PETTIT,
 T. P. SIMPSON.